(12) United States Patent
Fujino (10) Patent No.: US 10,436,645 B2
(45) Date of Patent: Oct. 8, 2019

(54) INSPECTION APPARATUS AND INSPECTION METHOD OF COLORIMETRIC VALUE

(71) Applicant: SEIKO EPSON CORPORATION, Tokyo (JP)

(72) Inventor: Makoto Fujino, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 102 days.

(21) Appl. No.: 15/805,617

(22) Filed: Nov. 7, 2017

(65) Prior Publication Data

US 2018/0149521 A1 May 31, 2018

(30) Foreign Application Priority Data

Nov. 29, 2016 (JP) ................. 2016-230849

(51) Int. Cl.
*G01J 3/46* (2006.01)
*B41J 2/21* (2006.01)
*G01J 3/52* (2006.01)
*H04N 1/60* (2006.01)

(52) U.S. Cl.
CPC ............ *G01J 3/462* (2013.01); *B41J 2/2103* (2013.01); *G01J 3/52* (2013.01); *H04N 1/6033* (2013.01); *G01J 2003/466* (2013.01); *H04N 1/6008* (2013.01); *H04N 1/6011* (2013.01)

(58) Field of Classification Search
CPC ......... G06T 7/0004; G06T 7/001; G06T 7/90; G06T 2207/30144; G01J 3/46; G01J 3/462; G01J 2003/466; G01J 3/52; H04N 1/6011; H04N 1/6033
See application file for complete search history.

(56) References Cited

U.S. PATENT DOCUMENTS

| 2008/0187860 | A1 | 8/2008 | Tsubaki et al. ............ 430/270.1 |
| 2008/0261150 | A1 | 10/2008 | Tsubaki et al. ............ 430/270.1 |
| 2009/0290180 | A1 | 11/2009 | Onoda | |
| 2009/0296118 | A1 | 12/2009 | Tsukamoto .................... 358/1.9 |
| 2010/0323305 | A1 | 12/2010 | Tsubaki et al. ............... 430/325 |
| 2012/0058436 | A1 | 3/2012 | Tsubaki et al. ............... 430/325 |
| 2012/0075645 | A1* | 3/2012 | Katayama et al. .. H04N 1/6055 358/1.9 |

(Continued)

FOREIGN PATENT DOCUMENTS

| EP | 2434745 A2 | 3/2012 |
| JP | 2009-288027 A | 12/2009 |

(Continued)

OTHER PUBLICATIONS

The Extended European Search Report for the corresponding European Patent Application No. 17203947.1 dated Apr. 30, 2018.

*Primary Examiner* — Andrew W Johns (57) ABSTRACT

An inspection apparatus includes a colorimetric value acquisition unit that acquires a colorimetric value of a patch positioned on a color chart, a decision unit that decides an approval status of the colorimetric value of the patch, on a basis of the colorimetric value of the patch and a reference value prepared for the patch, and a display processing unit that displays, on a display unit, a chart image simulating the color chart, and in which a color representing a patch image positioned in the chart image is displayed in a shape representing a decision result made by the decision unit.

10 Claims, 8 Drawing Sheets

(56) References Cited

U.S. PATENT DOCUMENTS

| | | | |
|---|---|---|---|
| 2012/0315449 A1 | 12/2012 | Tsubaki et al. | 428/195.1 |
| 2015/0079522 A1 | 3/2015 | Tsubaki et al. | G03F 7/30 |
| 2015/0233764 A1 | 8/2015 | Nakatsuka | G01J 3/52 |
| 2016/0103395 A1 | 4/2016 | Tsubaki et al. | G03F 7/30 |
| 2016/0349619 A1 | 12/2016 | Tsubaki et al. | G03F 7/325 |

FOREIGN PATENT DOCUMENTS

| | | | |
|---|---|---|---|
| JP | 2015-057667 A | 3/2015 | |
| JP | 2015-152552 A | 8/2015 | |

\* cited by examiner

STORAGE DEVICE — 114

400

| x-POSITION | y-POSITION | C | M | Y | K |
|---|---|---|---|---|---|
| 1 | 1 | C11 | M11 | Y11 | K11 |
| 1 | 2 | C12 | M12 | Y12 | K12 |
| 1 | 3 | C13 | M13 | Y13 | K13 |
| ⋮ | ⋮ | ⋮ | ⋮ | ⋮ | ⋮ |
| 2 | 1 | C21 | M21 | Y21 | K21 |
| ⋮ | ⋮ | ⋮ | ⋮ | ⋮ | ⋮ |
| x | y | Cxy | Mxy | Yxy | Kxy |
| ⋮ | ⋮ | ⋮ | ⋮ | ⋮ | ⋮ |

CS1

500

| C | M | Y | K | L1 | a1 | b1 |
|---|---|---|---|---|---|---|
| C11 | M11 | Y11 | K11 | L111 | a111 | b111 |
| C12 | M12 | Y12 | K12 | L112 | a112 | b112 |
| C13 | M13 | Y13 | K13 | L113 | a113 | b113 |
| ⋮ | ⋮ | ⋮ | ⋮ | ⋮ | ⋮ | ⋮ |
| C21 | M21 | Y21 | K21 | L121 | a121 | b121 |
| ⋮ | ⋮ | ⋮ | ⋮ | ⋮ | ⋮ | ⋮ |
| Cxy | Mxy | Yxy | Kxy | L1xy | a1xy | b1xy |
| ⋮ | ⋮ | ⋮ | ⋮ | ⋮ | ⋮ | ⋮ |

CS2

510

| L | a | b | R | G | B |
|---|---|---|---|---|---|
| ⋮ | ⋮ | ⋮ | ⋮ | ⋮ | ⋮ |
| Li | ai | bi | Ri | Gi | Bi |
| ⋮ | ⋮ | ⋮ | ⋮ | ⋮ | ⋮ |

INSPECTION APPARATUS AND INSPECTION METHOD OF COLORIMETRIC VALUE

BACKGROUND

1. Technical Field

The present invention relates to a technique for inspecting a colorimetric value of a patch positioned in a color chart.

2. Related Art

When color patches positioned on a printed color chart are measured, a resultant colorimetric value may differ from an expected color value. Accordingly, for example, JP-A-2009-288027 discloses an information processing apparatus, configured to compare the measured values acquired from a plurality of patches with predetermined reference values of the corresponding patches, to thereby acquire a color difference, and decide whether there is a measurement error of the patch, on the basis of a cumulative color difference obtained by aggregating the color difference acquired as above.

However, although the mentioned information processing apparatus displays on a monitor whether there is a measurement error of the patch, the information processing apparatus does not allow the approval status of the patches to be intuitively recognized, in view of the color chart in which the patches are positioned.

The foregoing drawback also applies to color charts other than the printed color chart.

SUMMARY

An advantage of some aspects of the invention is to provide a technique that enables an approval status of a patch to be intuitively recognized, in view of a color chart in which a plurality of patches are positioned.

In an aspect, the invention provides an inspection apparatus including a colorimetric value acquisition unit that acquires a colorimetric value of a patch positioned on a color chart, a decision unit that decides an approval status of the colorimetric value of the patch, on a basis of the colorimetric value of the patch and a reference value prepared for the patch, and a display processing unit that displays, on a display unit, a chart image simulating the color chart, and in which a color representing a patch image positioned in the chart image is displayed in a shape representing a decision result made by the decision unit.

In another aspect, the invention provides an inspection apparatus including a colorimetric value acquisition unit that acquires a colorimetric value of a patch positioned on a color chart, a decision unit that decides an approval status of the colorimetric value of the patch, on a basis of the colorimetric value of the patch and a reference value prepared for the patch, and a display processing unit that displays, on a display unit, a chart image simulating the color chart, and displaying a patch image decided as approved by the decision unit, out of a plurality of the patch images positioned in the chart image, with information indicating the approval of the patch image, the information being superposed on the approved patch image.

In still another aspect, the invention provides an inspection method including acquiring a colorimetric value of a patch positioned on a color chart, deciding an approval status of the colorimetric value of the patch, on a basis of the colorimetric value of the patch and a reference value prepared for the patch, and displaying, on a display unit, a chart image simulating the color chart, and in which a color representing a patch image positioned in the chart image is displayed in a shape representing a decision result made in the deciding of the approval status.

In still another aspect, the invention provides an inspection method including acquiring a colorimetric value of a patch positioned on a color chart, deciding an approval status of the colorimetric value of the patch, on a basis of the colorimetric value of the patch and a reference value prepared for the patch, and displaying, on a display unit, a chart image simulating the color chart, and displaying a patch image decided as approved in the deciding of the approval status, out of a plurality of the patch images positioned in the chart image, with information indicating the approval of the patch image, the information being superposed on the approved patch image.

In still another aspect, the invention provides an inspection program configured to cause a computer to execute a colorimetric value acquisition function including acquiring a colorimetric value of a patch positioned on a color chart, a decision function including deciding an approval status of the colorimetric value of the patch, on a basis of the colorimetric value of the patch and a reference value prepared for the patch, and a display processing function including displaying, on a display unit, a chart image simulating the color chart, and in which a color representing a patch image positioned in the chart image is displayed in a shape representing a decision result made by the decision function.

In still another aspect, the invention provides an inspection program configured to cause a computer to execute a colorimetric value acquisition function including acquiring a colorimetric value of a patch positioned on a color chart, a decision function including deciding an approval status of the colorimetric value of the patch, on a basis of the colorimetric value of the patch and a reference value prepared for the patch, and a display processing function including displaying, on a display unit, a chart image simulating the color chart, and displaying a patch image decided as approved by the decision function, out of a plurality of the patch images positioned in the chart image, with information indicating the approval of the patch image, the information being superposed on the approved patch image.

The foregoing techniques enable the approval status of the patch to be intuitively recognized, in view of the color chart in which the plurality of patches are positioned.

BRIEF DESCRIPTION OF THE DRAWINGS

The invention will be described with reference to the accompanying drawings, wherein like numbers reference like elements.

DESCRIPTION OF EXEMPLARY EMBODIMENT

Hereafter, embodiments of the invention will be described. As a matter of course, the embodiments described hereunder are merely exemplary, and the features of the embodiments may not always be mandatory to attain the expected advantage of the invention.

Outline of Technique Herein Proposed

Referring first to FIGS. 1 to 9, an outline of the technique according to the embodiments will be described. The accompanying drawings are all schematically illustrated, and hence may disagree from each other. Naturally, the elements employed in the invention are not limited to specific examples denoted by the corresponding numerals.

First Aspect

An inspection apparatus (e.g., host apparatus 100) according to a first aspect includes a colorimetric value acquisition unit U1, a decision unit U2, and a display processing unit U3. The colorimetric value acquisition unit U1 acquires a colorimetric value (e.g., L2, a2, and b2) of a patch PA1 positioned on a color chart CH1. The decision unit U2 decides an approval status of the colorimetric value of the patch PA1, on the basis of the colorimetric value of the patch PA1 and a reference value (e.g., expected color values L1, a1, and b1) prepared for the patch PA1. The display processing unit U3 displays, on a display unit (e.g., display device 115), a chart image CH2 simulating the color chart CH1, and in which a color representing a patch image PA2 positioned in the chart image CH2 is displayed in a shape representing a decision result made by the decision unit U2.

According to the first aspect, the color representing the patch image PA2 positioned in the chart image CH2 is displayed in the shape representing the decision result of the approval of the colorimetric value. Therefore, the inspection apparatus enables the approval status of the patch to be intuitively recognized, in view of the color chart in which the plurality of patches are positioned.

The decision making of the approval status of the colorimetric value is not limited to evaluating the colorimetric value in two levels, but also includes evaluating the colorimetric value in three or more levels. For example, the decision of approval of the colorimetric value may be made in two or more levels, and likewise the decision of disapproval of the colorimetric value may be made in two or more levels. This also applies to the subsequent aspects.

The displayed color representing the patch image includes a device color corresponding to the reference value in a color space that depends on the display unit, and a device color corresponding to the colorimetric value in a color space that depends on the display unit. This also applies to the subsequent aspects.

The shape of the displayed color representing the patch image may be different from the shape of the display region of the corresponding patch image. This also applies to the subsequent aspects.

Second Aspect

The display processing unit U3 may display, in the display region of the patch image PA2, at least one of a first device color corresponding to the reference value (L1, a1, and b1) in a display unit-dependent color space CS2 (see FIG. 5) which depends on the display unit 115, and a second device color corresponding to the colorimetric value (L2, a2, and b2) in the display unit-dependent color space CS2. Displaying thus at least one of the color corresponding to the reference value and the color corresponding to the colorimetric value enables the approval status of the patch to be more intuitively recognized.

Third Aspect

The display processing unit U3 may divide the display region of the patch image PA2 into an outer region RR0 and an inner region RR1 surrounded by the outer region RR0, in the case where the decision result is a first decision (decision of approval in the example of FIGS. 3 and 4) out of a plurality of decisions. In this case, the display processing unit U3 may display the first device color corresponding to the reference value (L1, a1, and b1) in the display unit-dependent color space CS2 which depends on the display unit 115, in one of the outer region RR0 and the inner region RR1, and display the second device color corresponding to the colorimetric value (L2, a2, and b2) in the display unit-dependent color space CS2, in the other of the outer region RR0 and the inner region RR1. The mentioned arrangement allows recognition that the first decision has been made, in view of the shape of the displayed color in the inner region RR1, thereby enabling the approval status of the patch to be more intuitively recognized.

Fourth Aspect

The display processing unit U3 may divide the display region of the patch image PA2 into a first region RW1 and a second region RW2, along a borderline BL crossing the display region of the patch image PA2, in the case where the decision result is a second decision (decision of disapproval in the example of FIGS. 3 and 4) out of a plurality of decisions. In this case, the display processing unit U3 may display the first device color corresponding to the reference value (L1, a1, and b1) in the display unit-dependent color space CS2 which depends on the display unit 115 in the first region RW1, and display the second device color corresponding to the colorimetric value (L2, a2, and b2) in the display unit-dependent color space CS2, in the second region RW2. The mentioned arrangement allows recognition that the second decision has been made, in view of the shape of the displayed color divided by the borderline BL crossing the display region of the patch image PA2, thereby enabling the approval status of the patch to be more intuitively recognized.

Fifth Aspect

The display processing unit U3 may divide the display region of the patch image PA2 into the first region RW1 and the second region RW2, in the case where the decision of disapproval is made. In this case, the display processing unit U3 may display the first device color corresponding to the reference value (L1, a1, and b1) in the display unit-dependent color space CS2 which depends on the display unit 115 in the first region RW1, and display the second device color corresponding to the colorimetric value (L2, a2, and b2) in the display unit-dependent color space CS2, in the second region RW2. In addition, in the case where the decision of approval is made, the display processing unit U3 may display, in the display region of the patch image PA2, the color representing the patch image PA2 in a different shape from that of the color representing the patch image PA2 displayed when the decision of disapproval is made. The mentioned arrangement allows recognition of the difference between the color corresponding to the colorimetric value and the color corresponding to the reference value, in view of the patch image PA2, when the decision of disapproval is made, thereby enabling the difference between the color of the patch and the color corresponding to the reference value to be easily recognized.

Sixth Aspect

The inspection apparatus 100 may include a reference value acquisition unit U4 that converts, into the reference value (L1, a1, and b1), a value representing the color forming the patch PA1 in the image forming apparatus-dependent color space CS1 (see FIG. 5) which depends on the image forming apparatus (e.g., printing apparatus 200), according to a profile (e.g., reference profile 500 shown in FIG. 5) describing the characteristics of the colors formed by the image forming apparatus and included in the color chart CH1. Generating thus the reference value from the value representing the color forming the patch PA1 in the image forming apparatus-dependent color space CS1 enables the approval status of the patch to be intuitively recognized.

Though not described in the foregoing aspect, it is a matter of course that the reference value may be prepared in advance.

Seventh Aspect

Figure 8A:
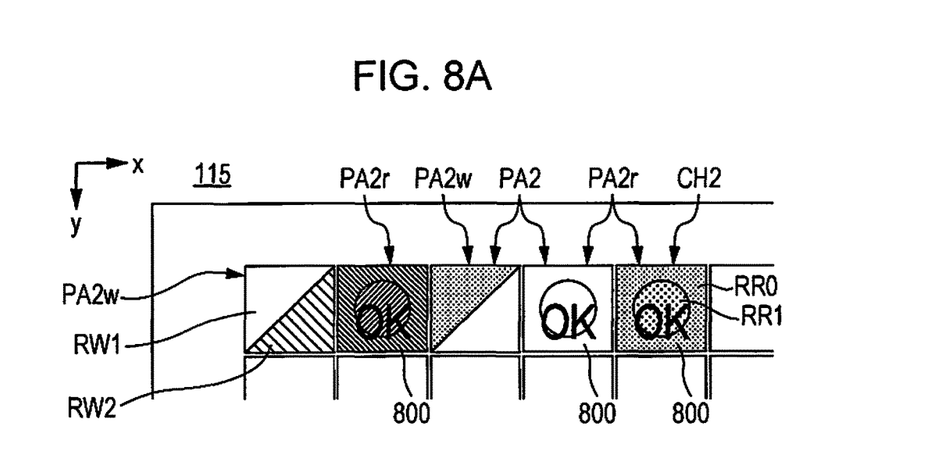
FIGS. 8A to 8C are schematic diagrams each showing a different example of the chart image.
Figure 8B:
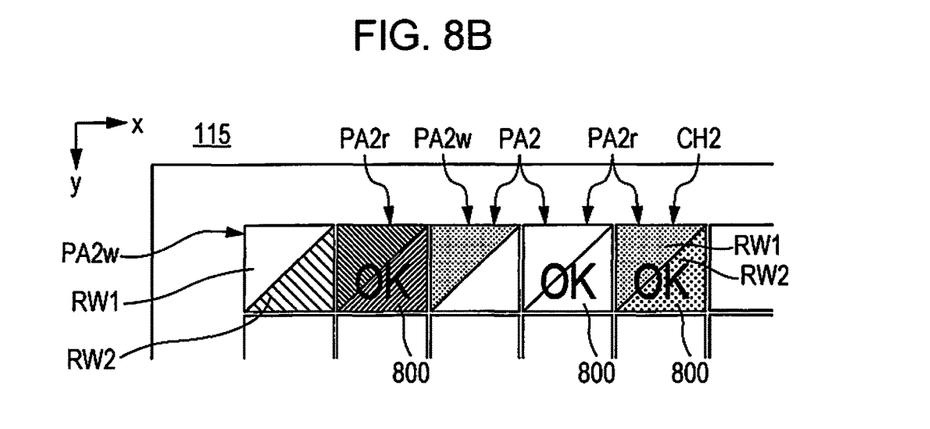
Figure 8C:
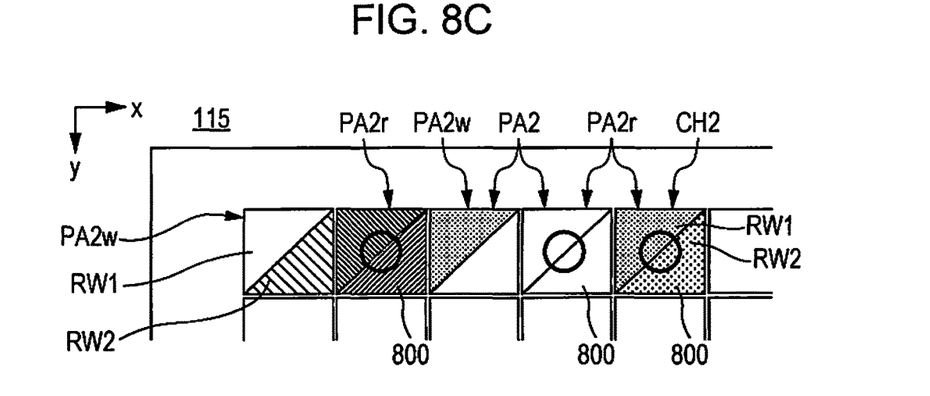

As shown in FIGS. 8A to 8C, in the case where the decision of approval has been made, the display processing unit U3 may display information indicating the approval (e.g., approval information 800), by superposing the information on the patch image PA2. In this case, the displayed color of the patch image PA2 that has been disapproved is not hidden by the approval information 800, and therefore the approval status of the patch can be more intuitively recognized.

Eighth Aspect

The inspection apparatus (e.g., host apparatus 100) according to an eighth aspect includes the colorimetric value acquisition unit U1, the decision unit U2, and the display processing unit U3. The colorimetric value acquisition unit U1 acquires the colorimetric value (e.g., L2, a2, and b2) of the patch PA1 positioned in the color chart CH1. The decision unit U2 decides the approval status of the colorimetric value of the patch PA1, on the basis of the colorimetric value of the patch PA1 and the reference value (e.g., expected color values L1, a1, and b1) prepared for the patch PA1. As shown in FIGS. 8A to 8C, the display processing unit U3 displays, on the display unit (e.g., display device 115), the chart image CH2 simulating the color chart CH1, and displaying the patch image PA2 decided as approved by the decision unit U2, out of the plurality of the patch images PA2 positioned in the chart image CH2, with the information indicating the approval of the patch image PA2 (e.g., approval information 800), the information being superposed on the approved patch image PA2. Thus, the displayed color of the patch image PA2 that has been disapproved is not hidden by the approval information 800, and therefore the approval status of the patch can be more intuitively recognized, in view of the color chart in which the plurality of patches are positioned.

Ninth Aspect

Figure 7A:
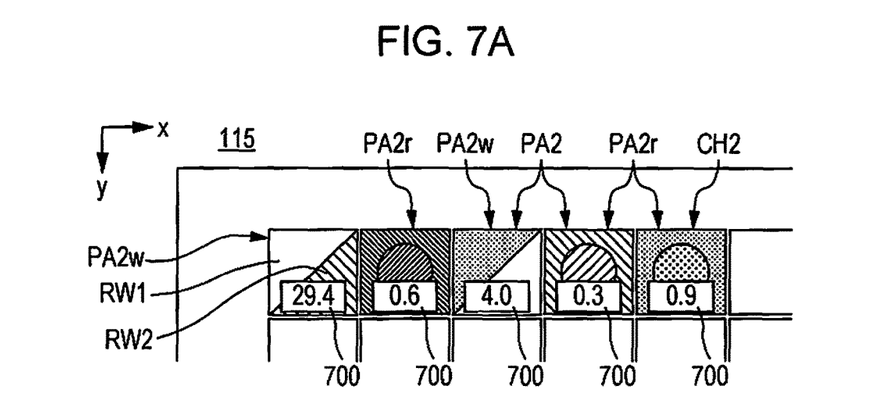
FIGS. 7A to 7C are schematic diagrams each showing a different example of the chart image.
Figure 7B:
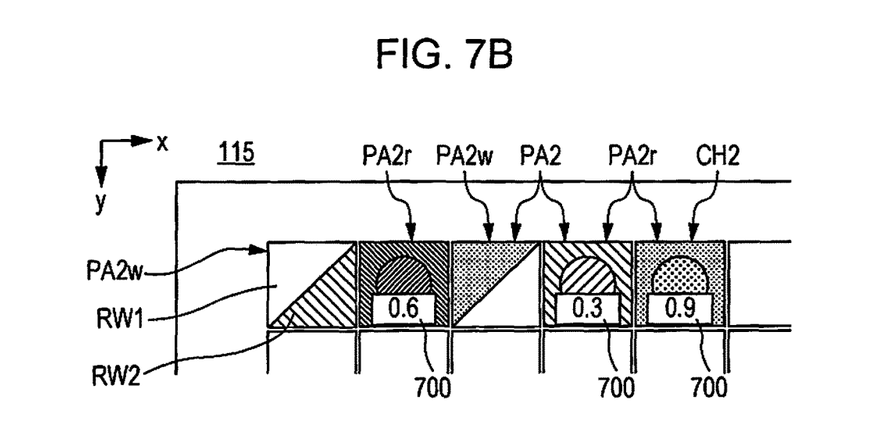
Figure 7C:
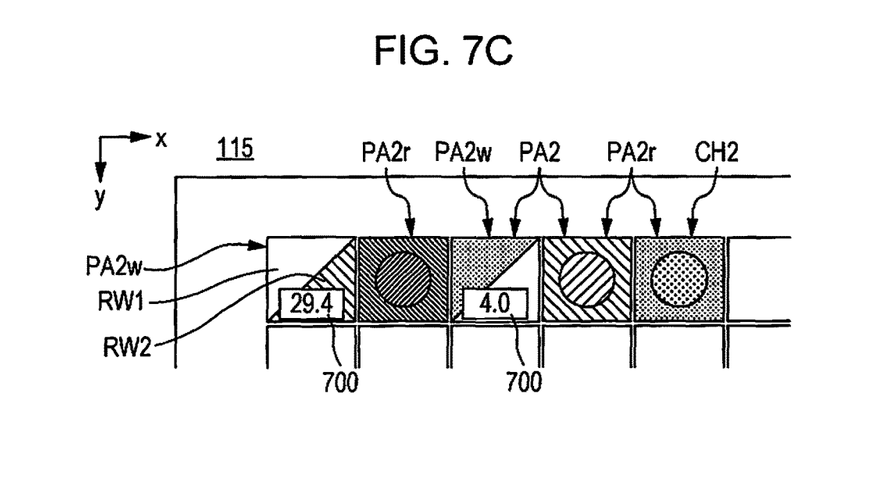

As shown in FIGS. 7A to 7C, the display processing unit U3 may display a numerical value 700 indicating the difference between the colorimetric value (L2, a2, and b2) and the reference value (L1, a1, and b1), in the corresponding display region of each of the patch images PA2. Such an arrangement allows the difference between the color of the patch and the color corresponding to the reference value to be easily recognized.

The difference between the colorimetric value and the reference value includes a color difference, a lightness difference, a chroma difference, and a hue difference.

The numerical value indicating the difference between the colorimetric value and the reference value may be displayed irrespective of the decision result.

Alternatively, the numerical value may be displayed when the decision result is the first decision, instead of when the decision result is the second decision, or when the decision result is the second decision, instead of when the decision result is the first decision.

Tenth Aspect

An inspection method according to a tenth aspect includes a first process ST1 corresponding to the operation of the colorimetric value acquisition unit U1 according to the first to the ninth aspects, a second process ST2 corresponding to the operation of the decision unit U2 according to the first to the ninth aspects, and a third process ST3 corresponding to the operation of the display processing unit U3 according to the first to the ninth aspects. The inspection method thus arranged enables the approval status of the patch to be intuitively recognized, in view of the color chart in which the plurality of patches are positioned. The mentioned inspection method may also include a fourth process ST4 corresponding to the operation of the reference value acquisition unit U4.

Eleventh Aspect

An inspection program PRO according to an eleventh aspect causes a computer to execute a colorimetric value acquisition function FU1 corresponding to the function of the colorimetric value acquisition unit U1 according to the first to the ninth aspects, a decision function FU2 corresponding to the function of the decision unit U2 according to the first to the ninth aspects, and a display processing function FU3 corresponding to the function of the display processing unit U3 according to the first to the ninth aspects. The inspection program thus arranged enables the approval status of the patch to be intuitively recognized, in view of the color chart in which the plurality of patches are positioned. The inspection program PRO may also cause the computer to execute a reference value acquisition function FU4 corresponding to the function of the reference value acquisition unit U4.

Further, the foregoing technique is applicable to a including the inspection apparatus, a control method and a control program of the composite apparatus, a computer-readable medium having the inspection program and the control program recorded thereon, and so forth. The mentioned apparatus may be constituted of a plurality of units separately assembled.

Specific Configuration of Inspection Apparatus

Figure 1:
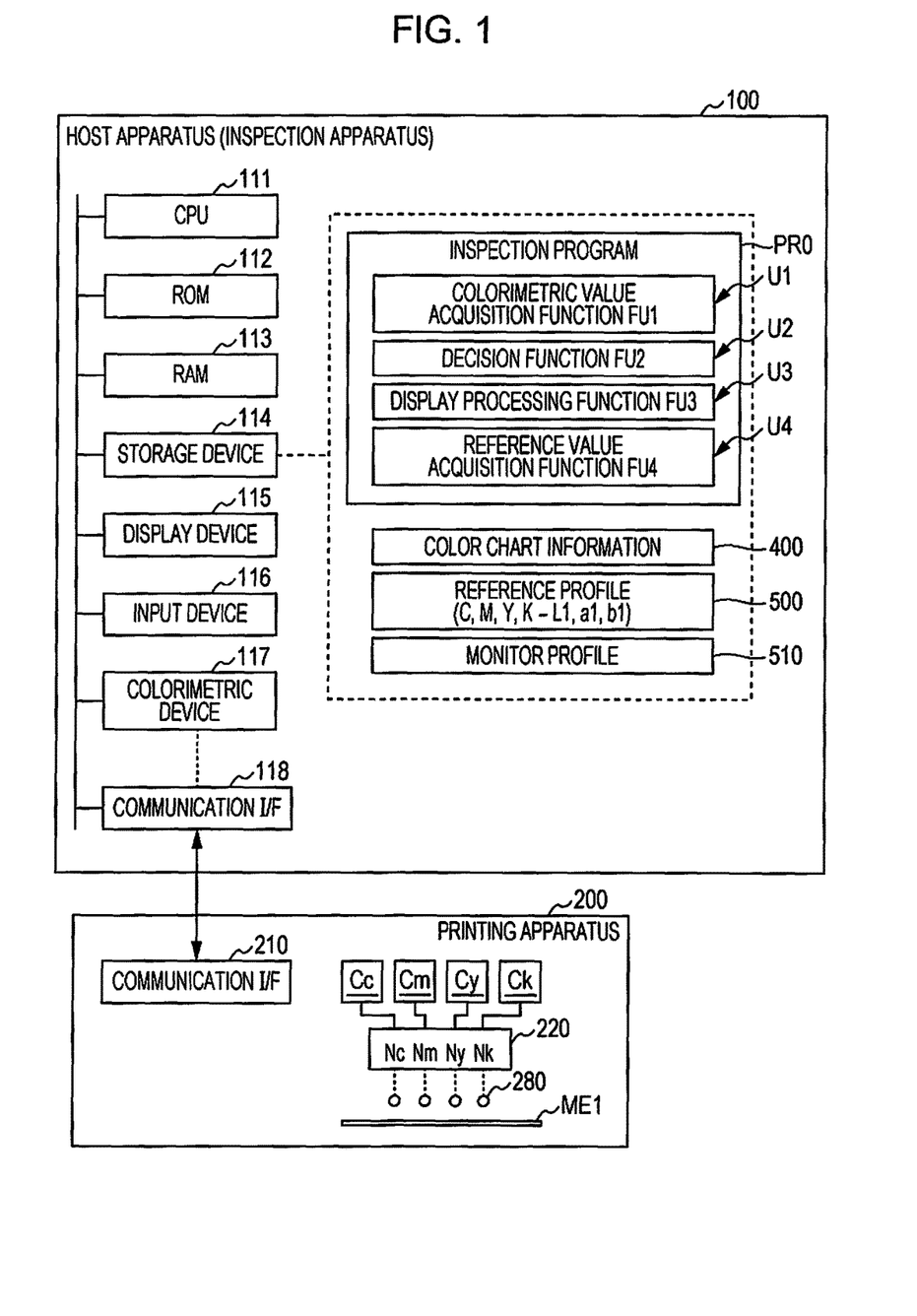
FIG. 1 is a block diagram showing a configuration of an inspection apparatus.

FIG. 1 schematically illustrates the configuration of the host apparatus 100 exemplifying the inspection apparatus. In the host apparatus 100, a central processing unit (CPU) 111, a read only memory (ROM) 112, a random access memory (RAM) 113, a storage device 114, the display device 115 (exemplifying the display unit), an input device 116, a colorimetric device 117, and a communication interface (I/F) 118 are connected to each other, so that information can be inputted to and outputted from each of the mentioned components.

The storage device 114 stores therein the inspection program PRO, a color chart information 400, the reference profile 500, and a monitor profile 510. The storage device 114 may be constituted of, for example, a non-volatile semiconductor memory such as a flash memory, or a magnetic storage device such as a hard disk. The display device 115 may be, for example, constituted of an LCD panel. The input device 116 may include, for example, hard keys including a pointing device and a keyboard, and a touch panel stuck to the surface of a display panel. The colorimetric device 117 is configured to measure the color of the color patch PA1 formed on a print substrate ME1, exemplifying the printing medium on which the color chart CH1 is formed, and output the colorimetric value. The patch is also called a color chip. The colorimetric value may represent, for example, a value indicating a lightness $L^*$ and a chromaticity coordinate $a^*$, $b^*$, in an $L^*a^*b^*$color space of Commission Internationale de l'Éclairage (International Commission on Illumination, CIE), which is a device-independent color space. Hereinafter, the symbol "*" may be omitted. The colorimetric device 117 may be provided outside the host apparatus 100. The host apparatus 100 acquires the colorimetric value from the colorimetric device 117, to execute various processings. The communication I/F 118 is connected to a communication I/F 210 of the printing apparatus 200 (exemplifying the image forming apparatus), to output and receive information to and from the printing apparatus 200. The communication I/Fs 118 and 210 may be configured according to the universal serial bus (USB) or short-range wireless communication standard. The communication I/Fs 118 and 210 may make a wired or wireless communication with each other, or via a network such as a local area network (LAN) or the internet.

The inspection program PRO shown in FIG. 1 causes the host apparatus 100 to realize the colorimetric value acquisition function FU1, the decision function FU2, the display processing function FU3, and the reference value acquisition function FU4. The color chart information 400, the reference profile 500, and the monitor profile 510 will be subsequently described in detail, with reference to FIG. 5.

The host apparatus 100 includes a computer, such as a personal computer, a tablet terminal inclusive. The host apparatus 100 may contain all the components 111 to 118 in a single casing, or may be constituted of a plurality of units communicably separated from each other. Further, the technique according to the embodiment can be realized also when the printing apparatus is incorporated in the host apparatus 100, and the printing apparatus having the printing function itself may execute the colorimetric value inspection according to the embodiment.

It will be assumed that the printing apparatus 200 shown in FIG. 1 is an ink jet printer configured to dispense (eject) inks of cyan (C), magenta (M), yellow (Y), and black (K) as color material from a recording head 220, to thereby form a printed image, for example the color chart CH1. The recording head 220 receives the cyan, magenta, yellow, and black (CMYK) ink from ink cartridges Cc, Cm, Cy, and Ck, respectively, and ejects CMYK ink droplets 280 through nozzles Nc, Nm, Ny, and Nk. When the ink droplets 280 land on the print substrate ME1, ink dots are formed thereon. As result, a printout, in other words the print substrate ME1 having an image printed thereon, is obtained.

The printing apparatus 200 acquires print data based on an output image generated by the host apparatus 100, and forms the printed image corresponding to the output image on the print substrate ME1, according to the print data.

Figure 2:
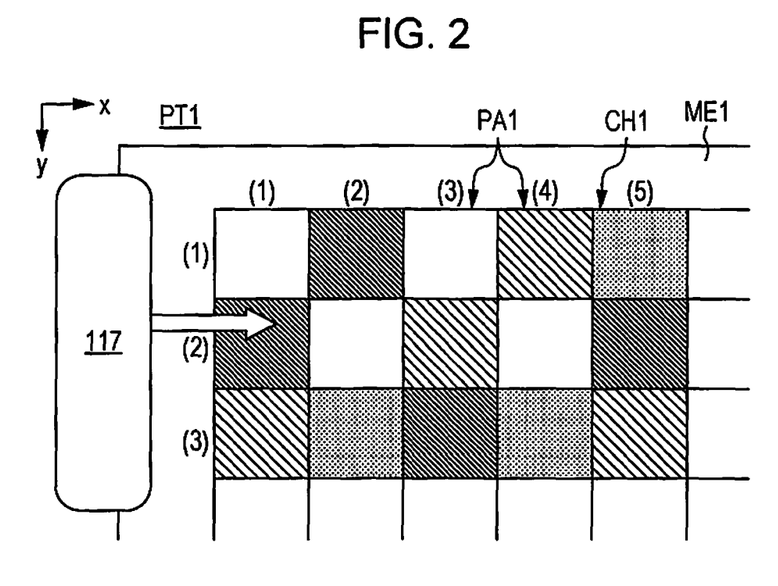
FIG. 2 is a schematic diagram showing how patches positioned on a color chart are measured.

FIG. 2 schematically illustrates a printout PT1 including the color chart CH1 formed on the print substrate ME1. On the color chart CH1, a plurality of color patches PA1 are aligned in an x-direction and a y-direction, which are orthogonal to each other. FIG. 2 includes, for convenience sake, numerical values each placed in a parenthesis for indicating the positions in the x-direction and the y-direction. Although FIG. 2 only illustrates five patches PA1 aligned in the x-direction and three patches PA1 aligned in the y-direction, actually a larger number of patches PA1 are aligned in the color chart CH1. Here, the arrangement of the plurality of patches PA1 in the color chart CH1 is not limited to the alignment in the x-direction and the y-direction, but may be an alignment in directions shifted from the x-direction and the y-direction.

The colorimetric device 117 measures the color of the patches PA1, for example while moving in the x-direction. The printout PT1 of the color chart CH1 may be moved in the y-direction, to thereby increase the number of patches PA1 that can be automatically measured.

Now, the colorimetric value acquired from the colorimetric device 117 may largely deviate from an expected color value. Presumable causes of such deviation include a human error committed by a user, and abnormality of the color chart itself. The human error of the user may include erroneous instruction of a start point and an end point of the measurement, placing the printout of the color chart in an opposite orientation by 180°, on the colorimetric device, setting the printouts of the color chart on the colorimetric device in an erroneous order when a plurality of printouts are utilized, and sticking a stain onto the color chart. The abnormality of the color chart itself may include a positional shift of the color of the patch due to improper ejection of the ink. The measurement error of the colorimetric value significantly affects the subsequent process to be performed using the colorimetric value, for example generation of a profile on the basis of the colorimetric value.

Here, simply displaying whether there has been a measurement error of the patch on the monitor, as does the information processing apparatus according to JP-A-2009-288027, does not enable the user to recognize which of the patches in the color chart has been erroneously measured. In this embodiment, in contrast, the chart image CH2 as shown in FIG. 3 is displayed on the display device 115, so as to enable the approval status of the patch to be intuitively recognized, in view of the color chart in which the plurality of patches are positioned.

Figure 3:
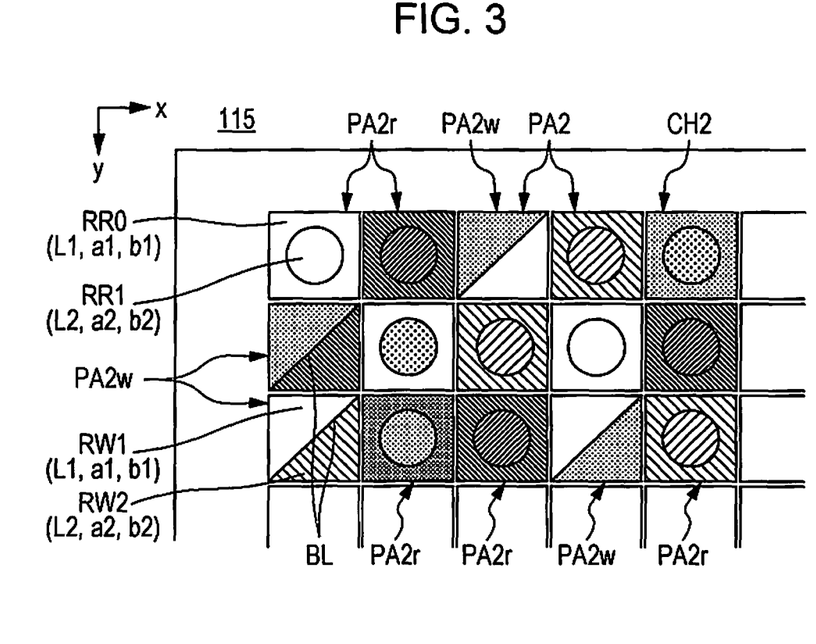
FIG. 3 is a schematic diagram showing examples of chart images displayed on a display unit.

FIG. 3 schematically illustrates an example of the chart image displayed on the display unit. The chart image CH2 shown in FIG. 3 is a displayed image that simulates the color chart CH1. The positions of the respective patch images PA2 in the chart image CH2 correspond to the positions of the patches PA1 in the color chart CH1. The plurality of patch images PA2 shown in FIG. 3 each include a patch image PA2r indicating a decision of approval (exemplifying the first decision), or a patch image PA2w indicating a decision of disapproval (exemplifying the second decision). Hereinafter, the decision of approval may be simply referred to as "approved", and the decision of disapproval may be referred to as "disapproved".

The display region of the approved patch image PA2r, which is generally rectangular like the patch PA1, is divided into the outer region RR0 (exemplifying the one of the regions), and the circular inner region RR1 (exemplifying the other region) surrounded by the outer region RR0. In the outer region RR0, a monitor color (exemplifying the first device color), corresponding to the expected color values L1, a1, and b1 (exemplifying the reference value) in the display unit-dependent color space CS2 (see FIG. 5) which depends on the display device 115, is displayed. Accordingly, the shape of the displayed color corresponding to the expected color value is different from the shape of the display region of the patch image PA2r. In the inner region RR1, a monitor color (exemplifying the second device color), corresponding to the colorimetric value L2, a2, and b2 of the patch PA1 in the display unit-dependent color space CS2 (see FIG. 5), is displayed. Accordingly, the shape of the displayed color corresponding to the colorimetric value is circular, which is different from the shape of the display region of the patch image PA2r. Here, the values L1 and L2 are L-values in the Lab color space, the values a1 and a2 are a-values in the Lab color space, and the values b1 and b2 are b-values in the Lab color space.

The display region of the disapproved patch image PA2w is also generally rectangular, like the patch PA1. However, the display region of the disapproved patch image PA2w shown in FIG. 3 is divided into the first region RW1 on the diagonally upper side and the second region RW2 on the diagonally lower side, by a straight diagonal line BL crossing the display region. Accordingly, the displayed colors in the regions RW1 and RW2 included in the display region of the disapproved patch image PA2w, and the displayed colors in the regions RR0 and RR1 included in the approved patch image PA2r are different in shape. In the first region RW1, the monitor color (exemplifying the first device color), corresponding to the expected color values L1, a1, and b1 in the display unit-dependent color space CS2, is displayed. Accordingly, the shape of the displayed color corresponding to the expected color value is triangular, which is different from the shape of the display region of the patch image PA2w. In the second region RW2, the monitor color (exemplifying the second device color), corresponding to the colorimetric value L2, a2, and b2 of the patch PA1 in the display unit-dependent color space CS2, is displayed. Accordingly, the shape of the displayed color corresponding to the colorimetric value is triangular, which is different from the shape of the display region of the patch image PA2r.

Specific Example of Colorimetric Inspection Performed by Inspection Apparatus

Figure 4:
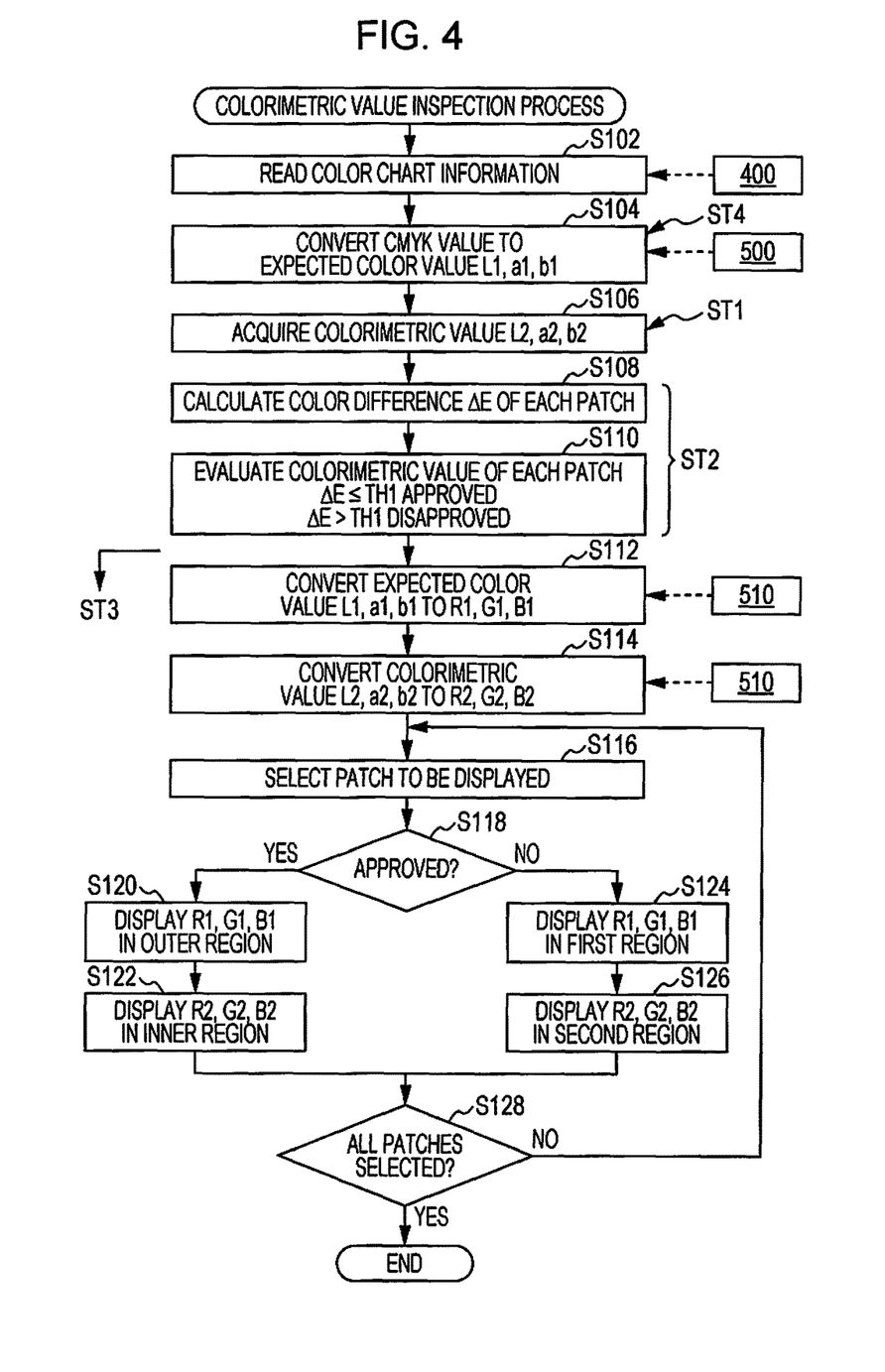
FIG. 4 is a flowchart showing a colorimetric value inspection process performed by an inspection apparatus.
Figure 5:
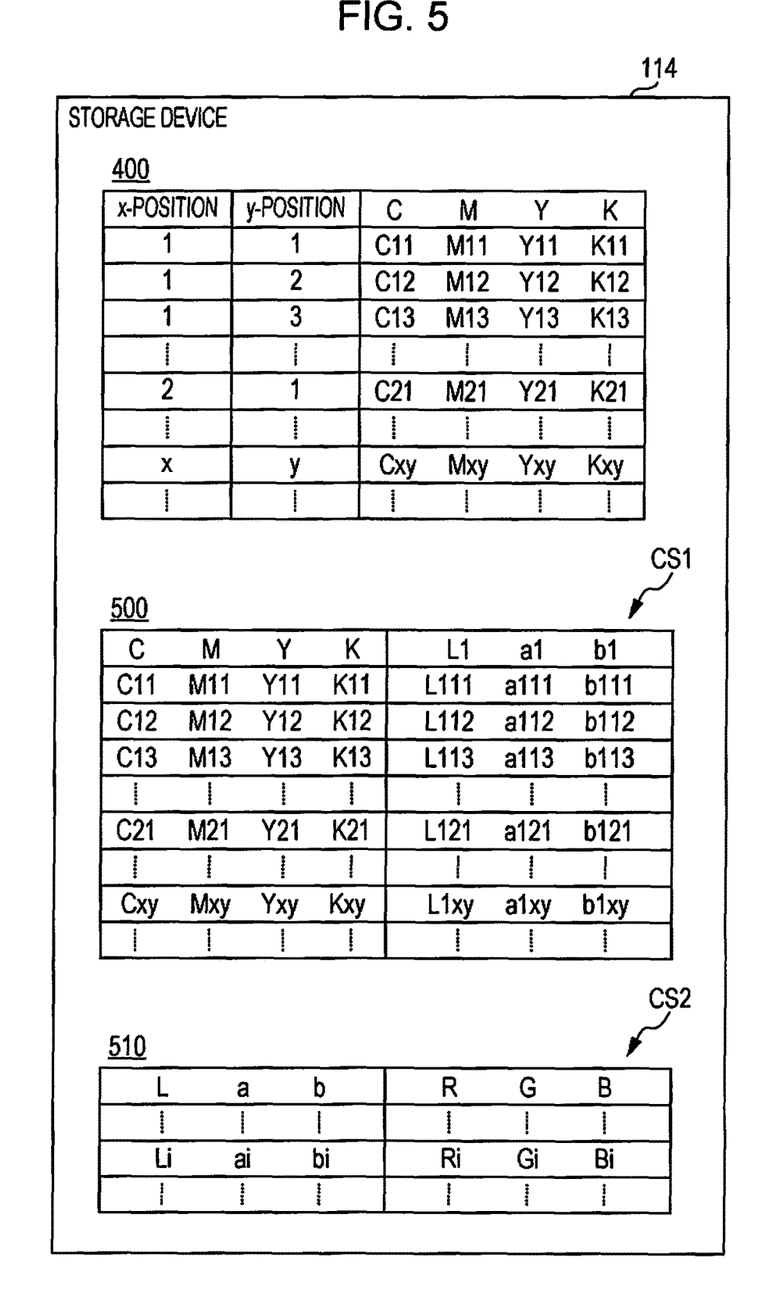
FIG. 5 includes tables respectively showing color chart information, reference profile, and monitor profile, stored in a storage device.

FIG. 4 is a flowchart showing a colorimetric value inspection process performed by the host apparatus 100 shown in FIG. 1. The host apparatus 100 is configured as a multitask apparatus that executes a plurality of processings in parallel. In FIG. 4, step S104 corresponds to the reference value acquisition unit U4, the fourth process ST4, and the reference value acquisition function FU4. Step S106 corresponds to the colorimetric value acquisition unit U1, the first process ST1, and the colorimetric value acquisition function FU1. Steps S108 to S110 correspond to the decision unit U2, the second process ST2, and the decision function FU2. Steps S112 to S128 correspond to the display processing unit U3, the third process ST3, and the display processing function FU3. Hereinafter, the term "step" will be omitted.

Upon starting the inspection, the host apparatus 100 reads the color chart information 400 (S102).

FIG. 5 schematically illustrates a structure of the color chart information 400 stored in the storage device 114. The color chart information 400 shown in FIG. 5 includes information indicating a printer color device value (ink consumption), a recording sequence, and alignment of each of the patches in the color chart, in which the forming position and the ink consumption are associated with each other, with respect to each of the patches PA1. Here, the forming position of the patch PA1 is defined by a position in the x-direction and a position in the y-direction. The ink consumption is defined, on the basis of the position (x, y) of the patch PA1, by a consumption Cxy of the C ink, a consumption Mxy of the M ink, a consumption Yxy of the Y ink, and a consumption Kxy of the K ink. The ink consumptions Cxy, Mxy, Yxy, and Kxy respectively indicate the amount of the CMYK inks, consumed to form the patch PA1 on the position (x, y). The ink consumptions Cxy, Mxy, Yxy, and Kxy may be defined on the basis of a gradation value, such as a $2^8$-gradation or $2^{16}$-gradation.

After reading the color chart information, the host apparatus 100 converts the values Cxy, Mxy, Yxy, and Kxy representing the color for forming the patch PA1 in the image forming apparatus-dependent color space CS1, into expected color values L1xy, a1xy, and b1xy, according to the reference profile 500 (S104). At this point, the expected color values L1xy, a1xy, and b1xy are prepared for each of the patches PA1. Here, the image forming apparatus-dependent color space CS1 is the device-dependent color space that depends on the printing apparatus 200, and corresponds to the CMYK color space in the example shown in FIG. 5.

FIG. 5 also schematically illustrates a structure of the reference profile 500 stored in the storage device 114. The reference profile 500 shown in FIG. 5 includes information in which the ink consumptions Cxy, Mxy, Yxy, and Kxy and the expected color values L1xy, a1xy, and b1xy are associated with each other. Such information may be prepared for each of the patches PA1, or set up irrespective of the ink consumption of the patch PA1, on the basis of a conversion such as an interpolation operation. The expected color values L1xy, a1xy, and b1xy may be defined as a predicted colorimetric values of the patch PA1, for example formed with the consumption Cxy, Mxy, Yxy, and Kxy of standard inks, on a standard printing medium. Naturally, in the case where the type of the printing medium to be used is determined, the colorimetric value expected to be acquired from the printing medium of that type may be adopted as the expected color value. Likewise, in the case where the type of the ink to be used is determined, the colorimetric value expected to be acquired from the ink of that type may be adopted as the expected color value.

After acquiring the expected color value, the host apparatus 100 acquires the colorimetric values L2, a2, and b2 of each of the patches PA1 in the color chart CH1 (S106). The user may set the printout PT1 of the color chart CH1 on the colorimetric device 117, to measure the patches PA1. The colorimetric device 117 measures each of the patches PA1, and outputs the colorimetric values L2, a2, and b2 of the patches PA1. Then the host apparatus 100 reads the colorimetric values L2, a2, and b2 from the colorimetric device 117, and store those values in at least one of the RAM 113 and the storage device 114.

Alternatively, to acquire the colorimetric values, the host apparatus 100 may cause the printing apparatus 200 to form the printout PT1 of the color chart CH1 according to the color chart information 400. When the printout PT1 thus formed is set on the colorimetric device 117, either by the user or automatically, the colorimetric device 117 measures each of the patches PA1, to acquire the colorimetric values L2, a2, and b2.

After acquiring the colorimetric values, the host apparatus 100 calculates a color difference LE between the colorimetric values L2, a2, and b2 and the expected color values L1, a1, and b1, with respect to each of the patches PA1 (S108). The color difference ΔE may be obtained from the following color difference equation, using a lightness difference ΔL between L2−L1, a color coordinate difference Δa between a2 and a1, and a color coordinate difference Δb between b2 and b1:

$$\Delta E = (\Delta L^2 + \Delta a^2 + \Delta b^2)^{1/2}$$

Here, a color difference $\Delta E_{00}$ obtained from the CIEDE2000 color difference equation may be adopted, in place of the color difference $\Delta E$ obtained from the above equation.

After calculating the color difference, the host apparatus 100 decides the approval status of the colorimetric values L2, a2, and b2 with respect to each of the patches PA1, on the basis of the colorimetric values L2, a2, and b2 and the expected color values L1, a1, and b1 (S110). For example, a threshold of the color difference $\Delta E$ may be determined as TH1 (TH1>0), so that the host apparatus 100 may decide as approved when the color difference $\Delta E$ is equal to or smaller than the threshold TH1, and as disapproved when the color difference $\Delta E$ is larger than the threshold TH1.

After deciding the approval status of the colorimetric value, the host apparatus 100 converts the expected color values L1, a1, and b1 of the patches PA1 into monitor colors R1, G1, and B1 (exemplifying the first device color) in the display unit-dependent color space CS2, according to the monitor profile 510 (S112). At this point, the monitor colors R1, G1, and B1, corresponding to the expected color values L1, a1, and b1 in the display unit-dependent color space CS2, are prepared for each of the patches PA1. Here, the display unit-dependent color space CS2 is the device-dependent color space that depends on the display device 115, and corresponds to the red, green, and blue (RGB) color space in the example shown in FIG. 5. An International Color Consortium (ICC) profile may be adopted as the monitor profile 510.

FIG. 5 also schematically illustrates a structure of the monitor profile 510 stored in the storage device 114. The monitor profile 510 shown in FIG. 5 includes information in which color values Li, ai, and bi in the Lab color space and monitor colors Ri (red), Gi (green), and Bi (blue) in the RGB color space are associated with each other. The variable "i" is for identifying a grid point. The grid point refers to an imaginary point arranged in the inputted color space, and it is assumed that an output coordinate value, corresponding to the position of the grid point in the inputted color space, is stored in the grid point.

The host apparatus 100 also converts, according to the monitor profile 510, the colorimetric values L2, a2, and b2 of the patches PA1 into the monitor colors R2, G2, and B2 (exemplifying the second device color) in the display unit-dependent color space CS2 (S114). At this point, the monitor colors R1, G1, and B1, corresponding to the expected color values L1, a1, and b1 in the display unit-dependent color space CS2, are prepared for each of the patches PA1.

After acquiring the monitor colors, the host apparatus 100 selects a target patch to be displayed (S116). More specifically, the host apparatus 100 selects one out of the forming positions (x, y) of all the patches yet to be processed. Then the host apparatus 100 branches the processing, according to the decision result with respect to the colorimetric values L2, a2, and b2 of the target patch (S118).

When the colorimetric values are approved, the host apparatus 100 divides the display region of the target patch into the outer region RR0 and the inner region RR1, and displays the monitor colors R1, G1, and B1 corresponding to the expected color values L1, a1, and b1 of the target patch, in the outer region RR0 (S120). The host apparatus 100 also displays the monitor colors R2, G2, B2 corresponding to the colorimetric values L2, a2, and b2 of the target patch in the inner region RR1 (S122). Thus, like the approved patch image PA2r shown in FIG. 3, the monitor colors corresponding to the colorimetric values L2, a2, and b2 are displayed inside the monitor colors corresponding to the expected color values L1, a1, and b1. Therefore, the user can intuitively recognize, in view of the chart image CH2 thus displayed, each of the approved patches in the color chart. In particular, since the inner region RR1 is circular, the user can easily recognize that the colorimetric value of the patch PA1 has been approved.

When the colorimetric values are disapproved, the host apparatus 100 divides the display region of the target patch into the first region RW1 on the diagonally upper side and the second region RW2 on the diagonally lower side, along the diagonal line BL crossing the display region of the target patch, and displays the monitor colors R1, G1, and B1, corresponding to the expected color values L1, a1, and b1 of the target patch, in the first region RW1 (S124). The host apparatus 100 also displays, in the second region RW2, the monitor colors R2, G2, and B2 corresponding to the colorimetric values L2, a2, and b2 of the target patch (S126). Thus, like the disapproved patch image PA2w shown in FIG. 3, the monitor colors corresponding to the expected color values L1, a1, and b1 are displayed on the diagonally upper side, and the monitor colors corresponding to the colorimetric values L2, a2, and b2 are displayed on the diagonally lower side. Therefore, the user can intuitively recognize, in view of the chart image CH2 thus displayed, each of the disapproved patches in the color chart, and further recognize how far the color of the disapproved patch is deviated from the expected color. In particular, since the regions RW1 and RW2 are separated from each other by the diagonal line BL, the user can easily recognize that the colorimetric value of the patch PA1 has been disapproved.

After the operation of S122 or S126, the host apparatus 100 decides whether all of the patches PA1 in the color chart CH1 have been selected as the target patch to be displayed (S128). In the case where one or more patches PA1 unselected yet as the target patch remain in the color chart CH1, the host apparatus 100 repeats the operation of S116 to S128. Accordingly, the chart image CH2, in which the color representing the patch image PA2 is displayed in the shape representing the decision result, is displayed on the display device 115. When all of the patches PA1 in the color chart CH1 have been selected as the target patch, the host apparatus 100 finishes the colorimetric value inspection.

The approved colorimetric value may be utilized to generate a profile such as the ICC profile or a color conversion look-up table (LUT). For example, a printer profile representing the characteristics of the colors formed by the printing apparatus 200 may be generated by associating the respective ink consumptions Cxy, Mxy, Yxy, and Kxy of the CMYK colors with the colorimetric values L2, a2, and b2. Then the color conversion LUT may be generated by associating the input coordinate value of the RGB color space with the output coordinate value of the CMYK color space, utilizing the mentioned printer profile and the monitor profile 510.

As described thus far, since the color representing each of the patch images PA2 positioned in the chart image CH2 is displayed in the shape representing the decision result of the approval status of the colorimetric value, the user can recognize how far the colorimetric value, of which of the patches in the color chart CH1, is deviated from the expected color value. Therefore, the user can easily figure out the reason why the colorimetric value of the patch is deviated from the expected color value, and remove the cause of the deviation to thereby acquire the accurate colorimetric value and generate the profile. Thus, the technique according to the embodiment enables the approval status of each of the patches to be intuitively recognized, in view of the color chart in which the plurality of patches are positioned.

Variations

The foregoing embodiment may be modified in various manners.

For example, the image forming apparatus is not limited to the ink jet printer, but may be a printer based on electrophotography such as a laser printer that employs a toner as color material, or a 3D printer. The image forming apparatus is not even limited to a printing apparatus, but may be a display device or the like. The type of the color material to form the printed image is not limited to CMYK, but may also include light cyan (Lc) less dense than cyan, light magenta (Lm) less dense than magenta, dark yellow (Dy) denser than yellow, orange (Or), green (Gr), light black (Lk) less dense than black, and a colorless material for improving the picture quality. Further, one or more of the CMYK colors may be omitted.

The foregoing inspection process may be modified as desired, for example changing the order of the steps. For example, in the colorimetric value inspection process shown in FIG. 4, the conversion to the monitor color of S112 and S114 may be performed before the operation of S108 or S110. The operations of S112 and S114 may be replaced with each other. In the case where the expected color value is determined in advance, the operation of S104 may be skipped.

The colorimetric value and the reference value may be tristimulus values X, Y, Z in the CIE XYZ color system, or values representing L*, u*, and v* in the CIE L*u*v* color space, instead of the values representing L, a, b in the Lab color space.

To decide the approval status of the colorimetric value of the patch, the lightness difference ΔL between L2 and L1, the color coordinate difference Δa between a2 and a1, the color coordinate difference Δb between b2 and b1, a chroma difference ΔC between $(a2^2+b2^2)^{1/2}$ and $(a1^2+b1^2)^{1/2}$, and a hue difference ΔH may be employed, in place of the color difference. Further, a plurality of items of information included in the mentioned values may be utilized for the decision of the approval status.

The decision of approval of the colorimetric value may be made in two or more levels. For example, a threshold TH2 may be defined as 0<TH2<TH1, and a decision of "excellent" may be made when ΔE is equal to or smaller than TH2, and a decision of "good" may be made when ΔE is larger than TH2 but equal to or smaller than TH1. In this case, the color representing the excellent patch image and the color representing the good patch image may be displayed in different shapes.

The decision of disapproval of the colorimetric value may also be made in two or more levels. For example, a threshold TH3 may be defined as TH1<TH3, and a decision of "bad" may be made when ΔE is larger than TH1 but equal to or smaller than TH3, and a decision of "very bad" may be made when ΔE is larger than TH3. In this case, the color representing the bad patch image and the color representing the very bad patch image may be displayed in different shapes.

The patch images may also be displayed in various different manners.

For example, in the display region of the approved patch image PA2r, the monitor color corresponding to the expected color values L1, a1, and b1 may be displayed in the inner region RR1, and the monitor color corresponding to the colorimetric values L2, a2, and b2 may be displayed in the outer region RR0. In this case, the inner region RR1 exemplifies the one region, and the outer region RR0 exemplifies the other region. Further, the shape of the inner region surrounded by the outer region is not limited to circular, but may be elliptical, polygonal, or a star shape.

In the display region of the disapproved patch image PA2w, the first region RW1 where the monitor color corresponding to the expected color values L1, a1, and b1 is to be displayed may be located on the diagonally lower side of the diagonal line BL, and the second region RW2 where the monitor color corresponding to the colorimetric values L2, a2, and b2 is to be displayed may be located on the diagonally upper side of the diagonal line BL. In addition, the line crossing the display region of the patch image is not limited to the diagonal line, but may be a horizontal line for locating the first region and the second region on the upper and lower sides, or a vertical line for locating the first region and the second region on the left and right sides. Further, a curved line or a zigzag line may be adopted in place of the straight line.

The shapes of the color representing the approved patch image and the color representing the disapproved patch image are not specifically limited, provided that the shapes are different from each other. For example, the display region of the approved patch image may be divided by a line crossing the display region, and the display region of the disapproved patch image may be divided into the outer region and the inner region.

Figures 6A, 6B:
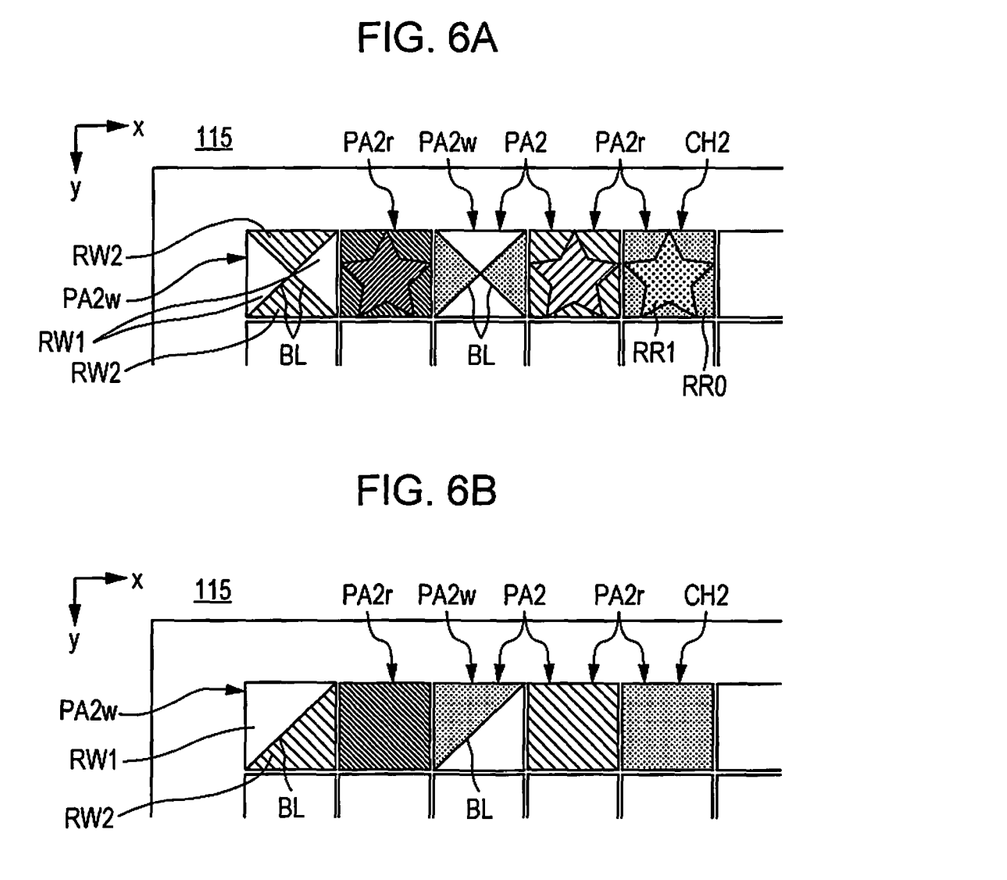
FIGS. 6A to 6C are schematic diagrams each showing a different example of the chart image.

FIG. 6A schematic illustrates a different example of the color representing the patch image. The chart image CH2 shown in FIG. 6A displays an approved patch image PA2r including a star-shaped inner region RR1, and a disapproved patch image PA2w including regions divided in an X-shape. The star-shaped inner region RR1 is inscribed in the rectangular display region of the patch image PA2r. The display region of the disapproved patch image PA2w is divided into four parts by two diagonal lines BL intersecting each other. The two parts of the first region RW1 are located on the left and right sides of the two diagonal lines BL. The two parts of the second region RW2 are located on the upper and lower sides of the two diagonal lines BL. In the outer region RR0 and the two parts of the first region RW1, for example, the monitor color corresponding to the expected color values L1, a1, and b1 is displayed. In the inner region RR1 and the two parts of the second region RW2, the monitor color corresponding to the colorimetric values L2, a2, and b2 is displayed.

The chart image CH2 shown in FIG. 6A can be displayed on the display device 115, according to the colorimetric value inspection process shown in FIG. 4. The example shown in FIG. 6A also enables the approval status of the patches to be intuitively recognized, in view of the color chart in which the plurality of patches are positioned.

FIG. 6B illustrates an example in which the approved patch image is displayed in a single color. In the display region of the approved patch image PA2r shown in FIG. 6B, which is not divided, for example the monitor color corresponding to the expected color values L1, a1, and b1 is displayed. In the colorimetric value inspection process, for example, the monitor color corresponding to the expected color values L1, a1, and b1 may be displayed all over the display region of the patch image PA2r, instead of the operations of S120 to S122 shown in FIG. 4.

Alternatively, the monitor color corresponding to the colorimetric values L2, a2, and b2, instead of the expected color values L1, a1, and b1, may be displayed in the display region of the patch image PA2r. In the colorimetric value inspection process, for example, the monitor color corresponding to the colorimetric values L2, a2, and b2 may be displayed all over the display region of the patch image PA2r, instead of the operations of S120 to S122 shown in FIG. 4.

In the example shown in FIG. 6B also, the color representing the approved patch image PA2r and the color representing the disapproved patch image PA2w are displayed in different shapes. In addition, when the colorimetric value of the patch is approved, the color corresponding to the expected color values L1, a1, and b1 and the color corresponding to the colorimetric values L2, a2, and b2 are barely different from each other. Accordingly, displaying the display region of the approved patch image PA2r in a single color makes it easier to visually recognize each of the patch images PA2 in the chart image CH2. Therefore, the example shown in FIG. 6B also enables the approval status of the patches to be more intuitively recognized, in view of the color chart in which the plurality of patches are positioned.

Figure 6C:
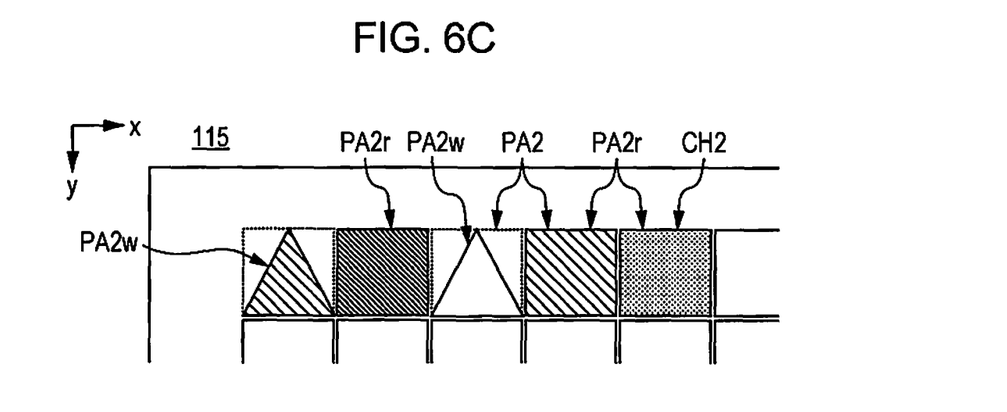

FIG. 6C schematically illustrates an example in which the disapproved patch image is displayed in a single color. The shape of the color representing the disapproved patch image PA2w shown in FIG. 6C is triangular, which is different from the rectangular shape of the color of the approved patch image PA2r, and for example the monitor color corresponding to the colorimetric values L2, a2, and b2 is displayed in the disapproved patch image PA2w. In the colorimetric value inspection process, for example, the monitor color corresponding to the colorimetric values L2, a2, and b2 may be displayed in the triangular shape, instead of the operations of S124 to S126 shown in FIG. 4.

Alternatively, the monitor color corresponding to the expected color values L1, a1, and b1, instead of the colorimetric values L2, a2, and b2, may be displayed in the triangular shape. In the colorimetric value inspection process, for example, the monitor color corresponding to the expected color values L1, a1, and b1 may be displayed in the triangular shape, instead of the operations of S124 to S126 shown in FIG. 4.

In the example shown in FIG. 6C also, the color representing the approved patch image PA2r and the color representing the disapproved patch image PA2w are displayed in different shapes. Therefore, the approval status of the patches can be intuitively recognized, in view of the color chart in which the plurality of patches are positioned.

FIG. 7A schematically illustrates the numerical values indicating the difference between the colorimetric value and the expected color value, displayed in the display region of the corresponding patch image. The color difference ΔE is displayed in a part of the display region of the patch image PA2 shown in FIG. 7A, as the numerical value 700 indicating the difference between the colorimetric value and the expected color value. In the colorimetric value inspection process, for example, the color difference ΔE calculated at S108 may be superposed on a part of the display region of the patch image PA2 as the numerical value 700, immediately after the operations of S122 and S126 shown in FIG. 4. The user can easily recognize, in view of the numerical value 700 superposed on a part of the patch image PA2, the difference between the color of the patch PA1 (colorimetric values L2, a2, and b2) and the expected color (expected color values L1, a1, and b1).

FIG. 7B schematically illustrates the case where the numerical value 700 is not displayed when the colorimetric values L2, a2, and b2 are disapproved, but displayed when the colorimetric values L2, a2, and b2 are approved. In this example, the color difference ΔE is displayed as the numerical value 700, on a part of the display region of the approved patch image PA2r. In the colorimetric value inspection process, for example, the color difference ΔE calculated at S108 may be superposed on a part of the display region of the approved patch image PA2r as the numerical value 700, immediately after the operations of S122 shown in FIG. 4. In the example shown in FIG. 7B, since the displayed color of the patch image PA2 that has been disapproved is not hidden by the numerical value 700, the approval status of the patch can be intuitively recognized, and also the difference between the color of the approved patch and the expected color can be easily recognized.

FIG. 7C schematically illustrates an example in which the numerical value 700 is not displayed when the colorimetric values L2, a2, and b2 are approved, but displayed when the colorimetric values L2, a2, and b2 are disapproved. In this example, the color difference ΔE is displayed as the numerical value 700, on a part of the display region of the disapproved patch image PA2w. In the calorimetric value inspection process, for example, the color difference ΔE calculated at S108 may be superposed on a part of the display region of the disapproved patch image PA2w as the numerical value 700, immediately after the operations of S126 shown in FIG. 4. With the arrangement of FIG. 7C, the position of the disapproved patch PA1 can be recognized in view of the patch image PA2 on which the numerical value 700 is superposed. Therefore, the approval status of the patch can be intuitively recognized, and also the difference between the color of the disapproved patch and the expected color can be easily recognized.

The numerical value indicating the difference between the colorimetric value and the expected color value may be, for example, a lightness difference, a chrome difference, or a hue difference, instead of the color difference.

FIG. 8A schematically illustrates an example in which information indicating the decision of approval is superposed on the approved patch image. A letter "OK", an example of the approval information 800, is superposed on the approved patch image PA2r shown in FIG. 8A. No information is displayed on the disapproved patch image PA2w. Here, the color representing the approved patch image PA2r and the color representing the disapproved patch image PA2w are displayed in different shapes. In the colorimetric value inspection process, for example, the letter "OK" may be superposed on the display region of the approved patch image PA2r as the approval information 800, immediately after the operation of S122 shown in FIG. 4. In the example shown in FIG. 8A, since the displayed color of the disapproved patch image PA2w is not hidden by the letter "OK", the approval status of the patch can be intuitively recognized, in view of the color chart in which the plurality of patches are positioned.

In the foregoing example, the shape of the color representing the approved patch image and the color representing the disapproved patch image may be replaced with each other.

FIG. 8B schematically illustrates an example in which the approval information 800 is superposed on the approved patch, in the case where the color representing the approved patch image PA2r and the color representing the disapproved patch image PA2w have the same shape. In this example also, the letter "OK" exemplifying the approval information 800 is superposed on the approved patch image PA2r. No information is displayed on the disapproved patch image PA2w. Here, the approved patch image PA2r is also divided into the first region RW1 on the diagonally upper side and the second region RW2 on the diagonally lower side, by the straight diagonal line BL crossing the display region, like the disapproved patch image PA2w.

Figure 9:
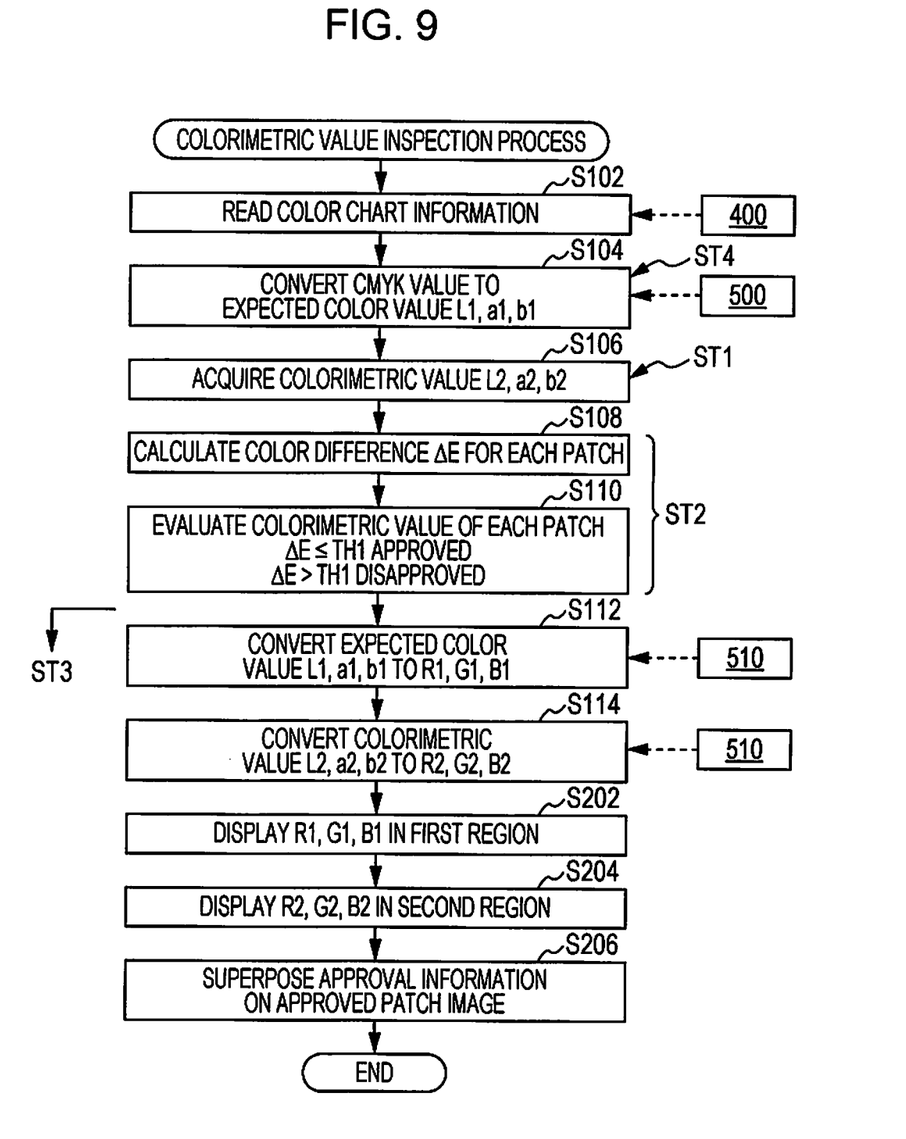
FIG. 9 is a flowchart showing another colorimetric value inspection process.

FIG. 9 shows a colorimetric value inspection process for displaying the chart image CH2 shown in FIG. 8B. In this process, the operations of S116 to S128 of the colorimetric value inspection process shown in FIG. 4 are substituted with operations of S202 to S206.

After the operations of S102 to S114, the host apparatus 100 divides the display region of the patch image PA2 into the first region RW1 on the diagonally upper side and the second region RW2 on the diagonally lower side, along the diagonal line BL crossing the display region of the patch image PA2, irrespective of the decision result, and displays the monitor colors R1, G1, and B1 corresponding to the expected color values L1, a1, and b1, in the first region RW1 (S202). The host apparatus 100 also displays the monitor colors R2, G2, and B2 corresponding to the colorimetric values L2, a2, and b2, in the second region RW2 (S204). Thus, like the patch images PA2r and PA2w shown in FIG. 8B, the monitor colors corresponding to the expected color values L1, a1, and b1 are displayed on the diagonally upper side, and the monitor colors corresponding to the colorimetric values L2, a2, and b2 are displayed on the diagonally lower side.

After the operation of S204, the host apparatus 100 superposes the letter "OK" on the approved patch image PA2r as the approval information 800 (S206), and finishes the colorimetric value inspection process.

With the arrangement of FIG. 8B, since the color representing the disapproved patch image PA2w is not hidden by the letter "OK", the approval status can be intuitively recognized, in view of the color chart in which the plurality of patches are positioned.

The approval information 800 may be expressed in letters other than "OK", a mark, a figure, a patter, or the like.

FIG. 8C schematically illustrates an example in which a mark is superposed on the approved patch image. A circle mark, an example of the approval information 800, is superposed on the approved patch image PA2r shown in FIG. 8C. The chart image CH2 shown in FIG. 8C can also be displayed according to the colorimetric value inspection process shown in FIG. 9. In the example shown in FIG. 8C, since the displayed color of the disapproved patch image PA2w is not hidden by the circle mark, the approval status of the patch can be intuitively recognized, in view of the color chart in which the plurality of patches are positioned.

The numerical value 700 such as the color difference ΔE may also be displayed, when the chart image CH2 including the approval information 800 is displayed. Naturally, the approval information 800 and the numerical value 700 may both be displayed in the same display region of the patch image PA2, or the numerical value 700 may be displayed in the display region of the disapproved patch image PA2w, instead of in the display region of the approved patch image PA2r.

CONCLUSION

As described thus far, various aspects of the invention provide a technique that enables an approval status of a patch to be intuitively recognized, in view of a color chart in which a plurality of patches are positioned. As a matter of course, even the technique only based on the independent claim provides the basic effects and advantages described above.

Further, the configurations described above may be substituted with each other, combined in a different manner, or substituted or combined with known techniques. Such modifications are also included in the scope of the invention.

This application claims priority under 35 U.S.C. § 119 to Japanese Patent Application No. 2016-230849, filed Nov. 29, 2016. The entire disclosure of Japanese Patent Application No. 2016-230849 is hereby incorporated herein by reference.

What is claimed is:

1. An inspection apparatus comprising:
a processor configured to execute a plurality of units including
a colorimetric value acquisition unit that acquires a colorimetric value of a patch positioned on a color chart;
a decision unit that decides an approval status of the colorimetric value of the patch, on a basis of the colorimetric value of the patch and a reference value prepared for the patch; and
a display processing unit that displays, on a display unit, a chart image simulating the color chart, and in which a color representing a patch image positioned in the chart image is displayed in a shape representing a decision result made by the decision unit.

2. The inspection apparatus according to claim 1, wherein the display processing unit displays, in a display region of the patch image, at least one of a first device color corresponding to the reference value in a display unit-dependent color space that depends on the display unit, and a second device color corresponding to the colorimetric value in the display unit-dependent color space.

3. The inspection apparatus according to claim 1, wherein the display processing unit divides, when the decision result is a first decision out of a plurality of decisions, a display region of the patch image into an outer region and an inner region surrounded by the outer region, displays a first device color corresponding to the reference value in a display unit-dependent color space that depends on the display unit, in one of the outer region and the inner region, and displays a second device color corresponding to the colorimetric value in the display unit-dependent color space, in the other of the outer region and the inner region.

4. The inspection apparatus according to claim 1, wherein the display processing unit divides, when the decision result is a second decision out of a plurality of decisions, a display region of the patch image into a first region and a second region along a line crossing the display region of the patch image, displays in the first region a first device color corresponding to the reference value in a display unit-dependent color space that depends on the display unit, and displays in the second region a second device color corresponding to the colorimetric value in the display unit-dependent color space.

5. The inspection apparatus according to claim 1, wherein the display processing unit divides, when the decision result is a decision of disapproval, a display region of the patch image into a first region and a second region, displays in the first region a first device color corresponding to the reference value in a display unit-dependent color space that depends on the display unit, and displays in the second region a second device color corresponding to the colorimetric value in the display unit-dependent color space, and
displays, when the decision result is a decision of approval, a color representing the patch image in a different shape from a shape of a color representing the patch image displayed when the decision result is the decision of disapproval.

6. The inspection apparatus according to claim 1, wherein the processor is configured to further execute a reference value acquisition unit that converts, into the reference value, a value representing a color forming the patch in an image forming apparatus-dependent color space that depends on an image forming apparatus, according to a profile describing characteristics of colors formed by the image forming apparatus and included in the color chart.

7. The inspection apparatus according to claim 1, wherein the display processing unit displays, when the decision result is a decision of approval, information indicating the decision of approval, by superposing the information on the patch image.

8. The inspection apparatus according to claim 1, wherein the display processing unit displays a numerical value indicating a difference between the colorimetric value and the reference value, in a corresponding display region of the patch image.

9. An inspection apparatus comprising:
a processor configured to execute a plurality of units including
  a colorimetric value acquisition unit that acquires a colorimetric value of a patch positioned on a color chart,
  a decision unit that decides an approval status of the colorimetric value of the patch, on a basis of the colorimetric value of the patch and a reference value prepared for the patch, and
  a display processing unit that displays, on a display unit, a chart image simulating the color chart, and displaying a patch image decided as approved by the decision unit, out of a plurality of the patch images positioned in the chart image, with information indicating the approval of the patch image such that the information is superposed on and overlapped with the approved patch image within a display region of the approved patch image.

10. An inspection method comprising:

acquiring a colorimetric value of a patch positioned on a color chart;

deciding an approval status of the colorimetric value of the patch, on a basis of the colorimetric value of the patch and a reference value prepared for the patch; and displaying, on a display unit, a chart image simulating the color chart, and in which a color representing a patch image positioned in the chart image is displayed in a shape representing a decision result made in the deciding of the approval status.

* * * * *